United States Patent
Obermann et al.

(10) Patent No.: US 11,242,894 B2
(45) Date of Patent: Feb. 8, 2022

(54) BEARING WITH INNER AND OUTER RINGS AND SYSTEM INCLUDING SUCH A BEARING

(71) Applicants: HELLA GmbH & Co. KGaA, Lippstadt (DE); Schaeffler Technologies AG & Co. KG, Herzogenaurach (DE)

(72) Inventors: Patrick Obermann, Warstein (DE); Marc Seiffert, Dortmund (DE); Manfred Bartscht, Salzkotten (DE); Horst Hartmann, Aurachtal (DE); Verena Arenz, Eckental (DE); Alexander Schamin, Oberasbach (DE)

(73) Assignees: HELLA GmbH & Co. KGaA, Lippstadt (DE); Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/833,038

(22) Filed: Mar. 27, 2020

(65) Prior Publication Data
US 2020/0224725 A1 Jul. 16, 2020

Related U.S. Application Data

(63) Continuation of application No. PCT/EP2017/074824, filed on Sep. 29, 2017.

(51) Int. Cl.
*F16C 41/00* (2006.01)
*F16C 33/58* (2006.01)
(52) U.S. Cl.
CPC ............ *F16C 41/002* (2013.01); *F16C 33/58* (2013.01); *F16C 2233/00* (2013.01)

(58) Field of Classification Search
CPC ........ F16C 33/58; F16C 33/78; F16C 33/784; F16C 33/7843; F16C 33/7846;
(Continued)

(56) References Cited

U.S. PATENT DOCUMENTS 4,875,785 A * 10/1989 Santos .................. F16C 41/007
384/448
5,130,650 A * 7/1992 Lemarquand ........... G01P 3/443
324/207.22
(Continued)

FOREIGN PATENT DOCUMENTS

CN 101144506 A 3/2008
EP 0652438 A1 5/1995
(Continued)

OTHER PUBLICATIONS

International Search Report in corresponding International Application No. PCT/EP2017/074824, dated May 28, 2018.
(Continued)

*Primary Examiner* — Phillip A Johnson
(74) *Attorney, Agent, or Firm* — Edell, Shapiro & Finnan, LLC

(57) ABSTRACT

A bearing comprises: an inner ring; an outer ring rotatable relative to the inner ring; and an inductive sensor for detecting a measured variable corresponding to a rotation of the outer ring relative to the inner ring. The sensor comprises a stator torque-proof connected to one of the inner ring and the outer ring, and a rotor torque-proof connected to the other of the inner ring and the outer ring.

13 Claims, 4 Drawing Sheets

(58) Field of Classification Search
CPC .................. F16C 33/7853; F16C 33/7856; F16C 35/063; F16C 35/067; F16C 41/002; F16C 41/007; G01P 3/443
See application file for complete search history.

(56) References Cited

U.S. PATENT DOCUMENTS

| | | | |
|---|---|---|---|
| 5,898,388 A | 4/1999 | Hofmann et al. | |
| 2003/0173844 A1* | 9/2003 | Iwamoto | F16C 41/004 310/90 |
| 2003/0234578 A1* | 12/2003 | Takahashi | G01P 3/443 303/168 |
| 2005/0174106 A1* | 8/2005 | Inoue | H02K 24/00 324/164 |
| 2011/0116733 A1* | 5/2011 | Siraky | G01P 3/483 384/448 |
| 2012/0169166 A1* | 7/2012 | Rink | H02K 7/09 310/90 |
| 2013/0057118 A1* | 3/2013 | Benkert | F16C 41/004 310/67 R |
| 2015/0043847 A1* | 2/2015 | Chaussat | G01P 1/02 384/129 |

FOREIGN PATENT DOCUMENTS

| | | |
|---|---|---|
| FR | 2574501 A1 | 6/1986 |
| JP | 2003-120701 A | 4/2003 |
| JP | 2006-023172 A | 1/2006 |
| JP | 2007139075 A | 6/2007 |

OTHER PUBLICATIONS

Office Action in corresponding Japanese Patent Application No. 2020-539133, dated Jun. 2, 2021, with English translation.

* cited by examiner

BEARING WITH INNER AND OUTER RINGS AND SYSTEM INCLUDING SUCH A BEARING

CROSS REFERENCE TO RELATED APPLICATIONS

This application is a continuation of International Application No. PCT/EP2017/074824, filed on Sep. 29, 2017, the entire contents of which are hereby incorporated by reference.

BACKGROUND

Bearings and bearing systems are already known in different embodiments.

EP 2 644 921 A1 discloses a system comprising a torque-proof part and a rotating part rotatable relative to the torque-proof part and a bearing comprising an inner ring and an outer ring, wherein the outer ring is torque-proof connected to the torque-proof part and the inner ring is torque-proof connected to the rotating part. The bearing of the known system comprises the inner ring and the outer ring rotatable relative to the inner ring, a sensor for detecting a measured variable corresponding to a rotation of the outer ring relative to the inner ring, wherein the sensor comprises a stator and a rotor.

SUMMARY

It is an object to provide a system and a bearing with a more compact design.

This object is solved by a bearing wherein the sensor is built as an inductive sensor and the stator is torque-proof connected to the inner ring and the rotor is torque-proof connected to the outer ring or the stator is torque-proof connected to the outer ring and the rotor is torque-proof connected to the inner ring.

A main advantage of the disclosed bearing and the system is that a more compact design of the bearing and the system is possible. Because of connecting the stator torque-proof to the inner ring and the rotor torque-proof to the outer ring or the stator torque-proof to the outer ring and the rotor torque-proof to the inner ring the inventive design can be much more integral than the known designs. Furthermore, the handling and the manufacture of the inventive bearing and the inventive system are improved.

Basically, the inductive sensor can be of any useful and applicable type, material, dimension and arrangement. The inductive sensor could be an incremental type inductive sensor, for example an incremental angle sensor in order to detect a rotational speed or to count a number of revolutions of a shaft. Advantageously, the inductive sensor is built as an absolute inductive sensor. That way, it is possible to measure not only a rotational speed or a number of revolutions of a shaft or something similar, but to measure a specific position of the inner ring relative to the outer ring of the bearing. Furthermore, with the inductive sensor being an absolute inductive sensor it is possible to measure a specific position of the inner ring relative to the outer ring of the bearing without even rotating the inner ring relative to the outer ring. With an absolute inductive sensor high resolution measurement of a measured variable is also possible.

A further advantageous development of the disclosed bearing is that the inner ring and the outer ring form a bearing area for bearing the inner ring relative to the outer ring and a sensor area for supporting the inductive sensor, wherein a spatial dimension of the sensor area is defined by the inner ring and the outer ring. Hereby, clearly defined areas for bearing the inner ring relative to the outer ring on the one side and for supporting the inductive sensor on the other side are built. Thus, both areas, the bearing area and the sensor area, can be designed for the specific use.

An advantageous development of the aforementioned embodiment is that the sensor area and the inductive sensor are built and arranged such that the stator and the rotor of the inductive sensor are completely received in the sensor area. That way, the handling and the manufacture of the inductive sensor as well as of the bearing are further improved.

A further advantageous development of the disclosed bearing is, that the inner ring and the outer ring are radially arranged to a center axis of the bearing and electromagnetic coupling elements of the stator and the rotor of the inductive sensor corresponding to each other are arranged substantially perpendicular to the center axis of the bearing. Hereby, the inventive bearing is on the one side quite compact and on the other side there is enough space for the stator and the rotor of the inductive sensor.

Another advantageous development of the disclosed bearing is that a spacer is arranged between the stator and the inner ring or the outer ring, to which the stator is torque-proof connected. Thus, the spacer is either arranged between the stator and the inner ring or between the stator and the outer ring, depending on whether the stator is connected to the inner ring or to the outer ring. That way, it is quite easy to establish a correct distance between the stator and the rotor of the inductive sensor.

In general, the spacer according to the aforementioned embodiment can be of any useful and applicable type, design, material, dimension and arrangement. Advantageously, the spacer is built like a ring, because of the fact that a ring is a standard unit and available in many different designs and materials.

In contrast to the aforementioned embodiment, another favorable embodiment of the disclosed bearing comprising a spacer is that the stator comprises a support, electronics and a casting compound, wherein the electronics are supported by the support and are at least partly covered by the casting compound, and wherein the spacer is built like a sleeve for forming a defined area for the casting compound for sealing the electronics at least in part. Hereby, the spacer not only creates a defined distance between the stator and the rotor of the inductive sensor, but also provides support to cast the casting compound.

Another advantageous development of the disclosed bearing is that the stator comprises a support, electronics and a casting compound, wherein the electronics are supported by the support and are at least partly covered by the casting compound, and wherein the support comprises a collar for forming a defined area for the casting compound. Similar to the aforementioned embodiment, the support with the collar provides support to cast the casting compound for sealing the electronics at least in part.

A further advantageous development of the disclosed bearing is that the bearing comprises a seal that is built and arranged such that the inductive sensor is sealed relative to an environment of the bearing. Therefore, the inductive sensor is completely sealed relative to an environment of the bearing.

Analogous to the advantageous development of the aforementioned bearing, an advantageous development of the disclosed system is that the system comprises a seal that is built and arranged such that the inductive sensor is sealed relative to an environment of the bearing.

A particular advantageous development of the disclosed bearing is that the bearing comprises an electromagnetic element that is built and arranged such that a defined electromagnetic environment is formed for the inductive sensor. That way, the electromagnetic parameters of the inductive sensor influenced by the environment can be handled more easily.

Analogous to the advantageous development of the aforementioned bearing, an advantageous development of the disclosed system is that the system comprises an electromagnetic element that is built and arranged such that a defined electromagnetic environment is formed for the inductive sensor.

BRIEF DESCRIPTION OF THE DRAWINGS

The Figures are schematic illustrations of the disclosed bearings and systems, wherein only the details necessary for the understanding of the disclosed bearings and systems are shown.

DETAILED DESCRIPTION

Figure 1:
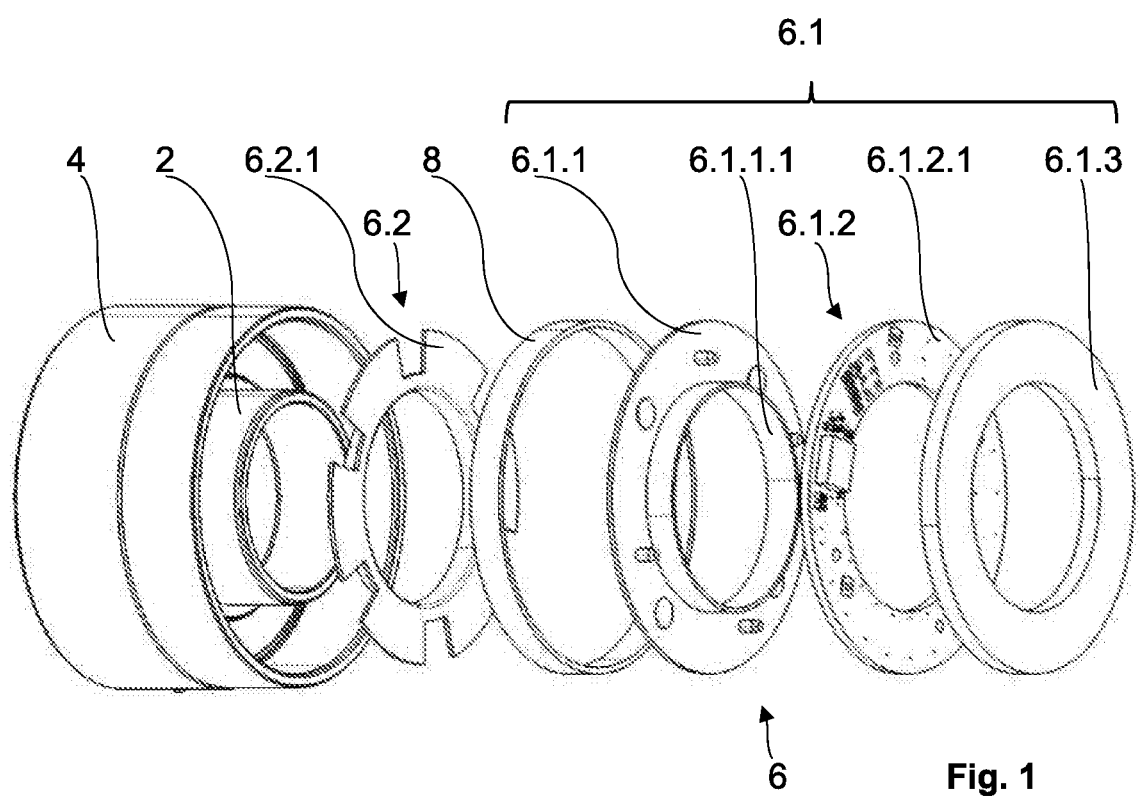
FIG. 1 is a first embodiment of a bearing and a system in an exploded view.

FIG. 1 displays a first embodiment of a bearing and a system, comprising an inner ring 2 and an outer ring 4 rotatable relative to the inner ring 2, an inductive sensor 6 for detecting a measured variable corresponding to a rotation of the outer ring 4 relative to the inner ring 2, wherein the inductive sensor 6 comprises a stator 6.1 and a rotor 6.2. The inductive sensor 6 is built as an absolute inductive sensor 6 for measuring an angular position of the inner ring 2 relative to the outer ring 4 of the bearing. Thus, the position of the inner ring 2 relative to the outer ring 4 is the measured variable corresponding to a rotation of the outer ring 4 relative to the inner ring 2.

The bearing is built like a ball bearing and connected with the inner ring 2 to a rotational shaft and with the outer ring 4 to a housing. The housing and the shaft relative rotatable to the housing are not displayed. The aforementioned components, namely the bearing, the housing and the shaft are parts of a system comprising a torque-proof part, namely the housing, and a rotating part rotatable relative to the torque-proof part, namely the shaft, and the bearing comprising the inner ring 2 and the outer ring 4, wherein the outer ring 4 is torque-proof connected to the torque-proof part and the inner ring 2 is torque-proof connected to the rotating part.

The stator 6.1 of the inductive sensor 6 comprises a support 6.1.1, electronics 6.1.2 and a casting compound 6.1.3, wherein the electronics 6.1.2 are supported by the support 6.1.1 and are at least partly covered by the casting compound 6.1.3. The electronics 6.1.2 of the stator 6.1 comprising electromagnetic coupling elements for electromagnetic coupling with the rotor 6.2 known to a person skilled in the art, for example transmitter tracks and receiver tracks arranged on a surface of a printed circuit board 6.1.2.1 of the electronics 6.1.2. The electromagnetic coupling elements of the stator 6.1 are not displayed. In order to cast the casting compound 6.1.3 of the stator 6.1 more easily, the support 6.1.1 of the stator 6.1 comprises a collar 6.1.1.1 for forming a defined area for the casting compound 6.1.3. The stator 6.1 is torque-proof connected to the outer ring 4 of the bearing, whereas the rotor 6.2 is torque-proof connected to the inner ring 2 of the bearing.

Connecting the stator 6.1 of the inductive sensor 6 to the torque-proof outer ring 4, thus to the torque-proof part, namely the housing, has advantages compared to connecting the stator 6.1 of the inductive sensor 6 to the rotatable inner ring 2, thus to the rotating part, namely the shaft, because of an easy design of an electronic connection of the electronics 6.1.2 of the stator 6.1 via wire. In order to keep a defined space between the stator 6.1 and the rotor 6.2 of the inductive sensor 6 the bearing comprises a spacer 8, too. The spacer 8 is built like a ring 8 and made from a plastic material in order not to influence the electromagnetic coupling between the stator 6.1 and the rotor 6.2 of the inductive sensor 6.

Figure 2:
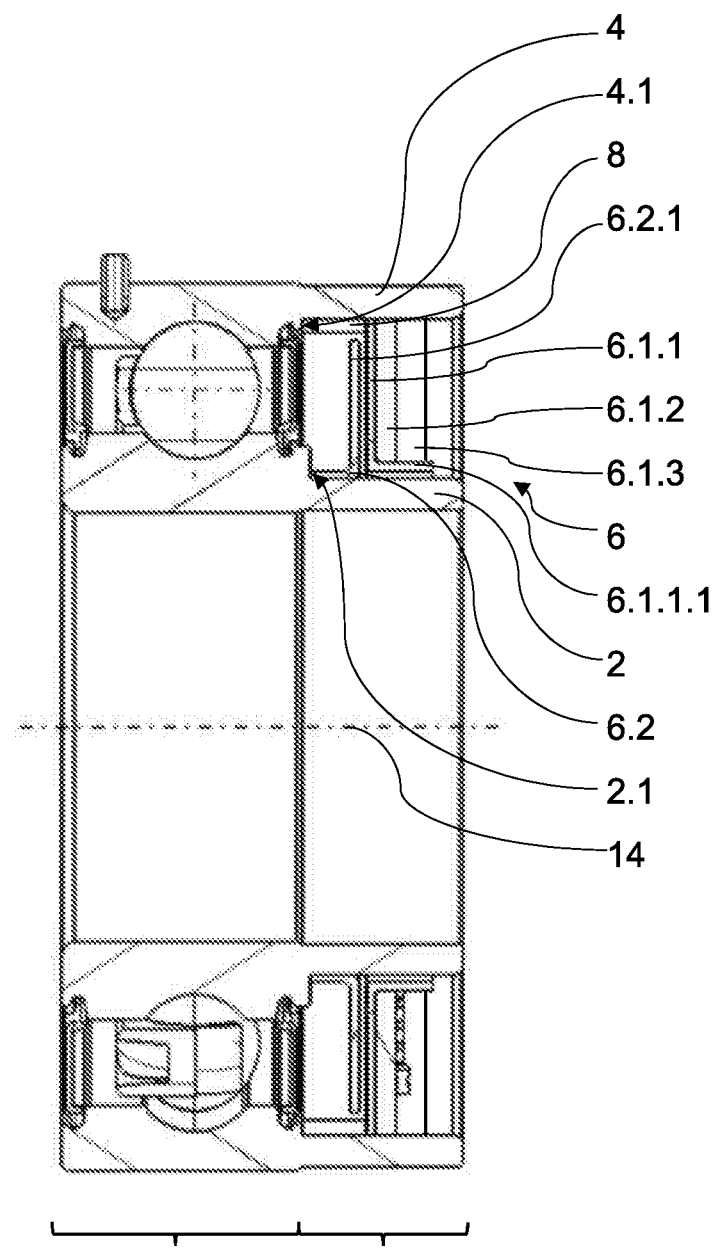
FIG. 2 the first embodiment of a bearing and a system in a sectional view.

In FIG. 2 the bearing according to the first embodiment is displayed in an assembled state. As can be seen clearly from FIG. 2, the inner ring 2 and the outer ring 4 are forming a bearing area 10 for bearing the inner ring 2 relative to the outer ring 4 and a sensor area 12 for supporting the inductive sensor 6, wherein a spatial dimension of the sensor area 12 is defined by the inner ring 2 and the outer ring 4 of the bearing. The inner ring 2 and the outer ring 4 are each built as a single piece and radially arranged to a center axis 14 of the bearing. In order to form the bearing area 10 and the sensor area 12, the inner ring 2 and the outer ring 4 are, compared to a standard bearing, e.g., a ball bearing, extended parallel to the center axis 14 of the bearing. The bearing area 10 and the sensor area 12 of the bearing are divided by shoulders 2.1, 4.1 of the inner ring 2 and the outer ring 4.

The spacer 8 is positioned next to the shoulder 4.1 of the outer ring 4 of the bearing in order to keep a defined distance between the shoulder 4.1 and the stator 6.1 of the inductive sensor 6. The rotor 6.2 of the inductive sensor 6 is arranged with respect to the inner ring 2 of the bearing next to the shoulder 2.1 of the inner ring 2. Thus, the stator 6.1 and the rotor 6.2 of the inductive sensor 6 are positioned to each other by the spacer 8 in a defined distance.

The stator 6.1 is arranged to the spacer 8 via the support 6.1.1 of the stator 6.1. The electronics 6.1.2 of the stator 6.1 are arranged on the support 6.1.1 and are at least partly covered by the casting compound 6.1.3 of the stator 6.1. In order to cast the casting compound 6.1.3, the casting compound 6.1.3 is put into an area defined by the support 6.1.1 with the collar 6.1.1.1 and the outer ring 4 of the bearing.

As can be seen best from FIG. 2, the sensor area 12 and the inductive sensor 6 are built and arranged in such a manner, that the stator 6.1 and the rotor 6.2 of the inductive sensor 6 are completely received in the sensor area 12. Furthermore, FIG. 2 displays clearly, that the electromagnetic coupling elements of the stator 6.1 and the rotor 6.2, namely wings 6.2.1 of the rotor 6.2, of the inductive sensor 6 corresponding to each other are arranged substantially perpendicular to the center axis 14 of the bearing.

Figure 3:
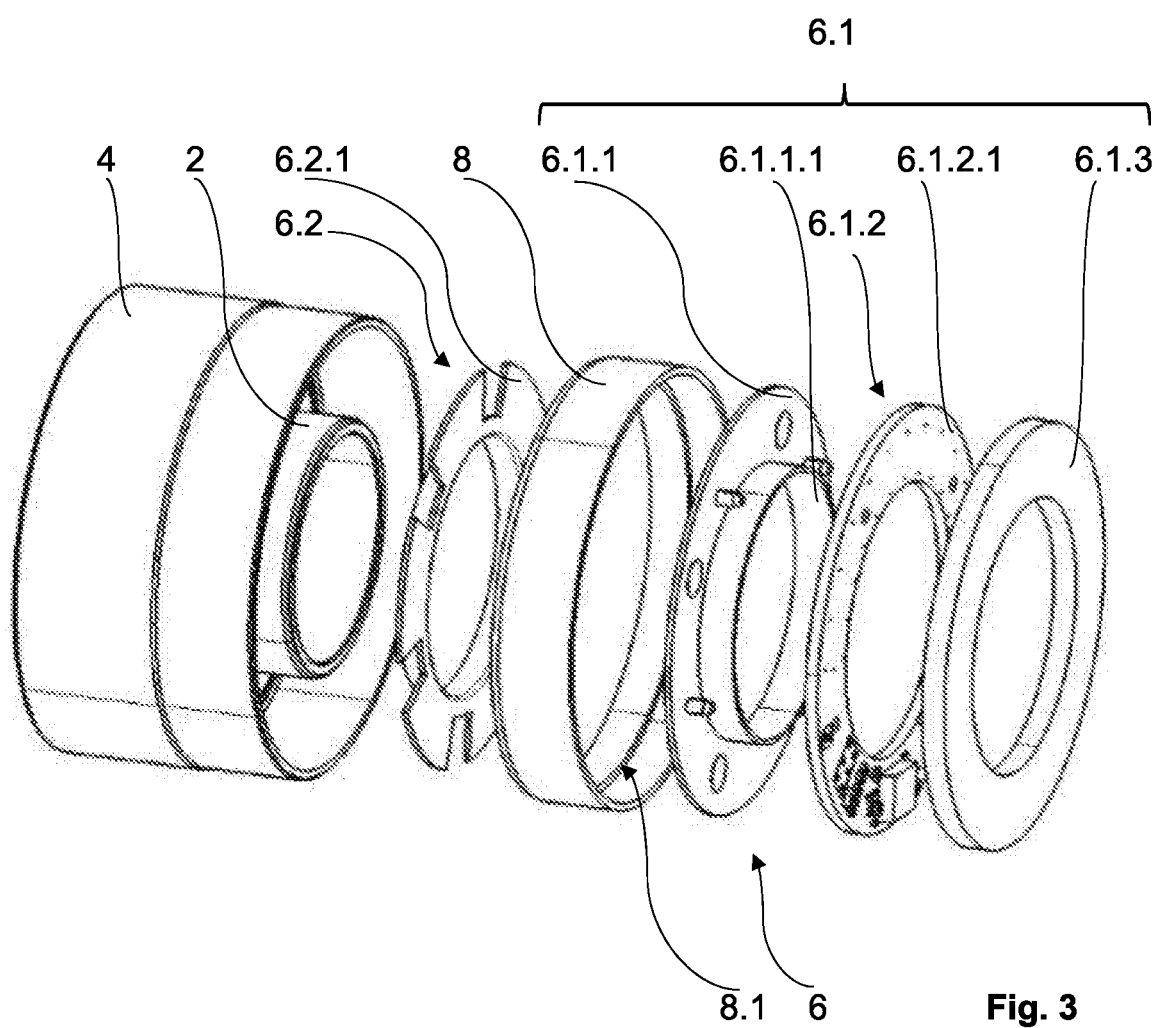
FIG. 3 is a second embodiment of a bearing and a system in an exploded view.
Figure 4:
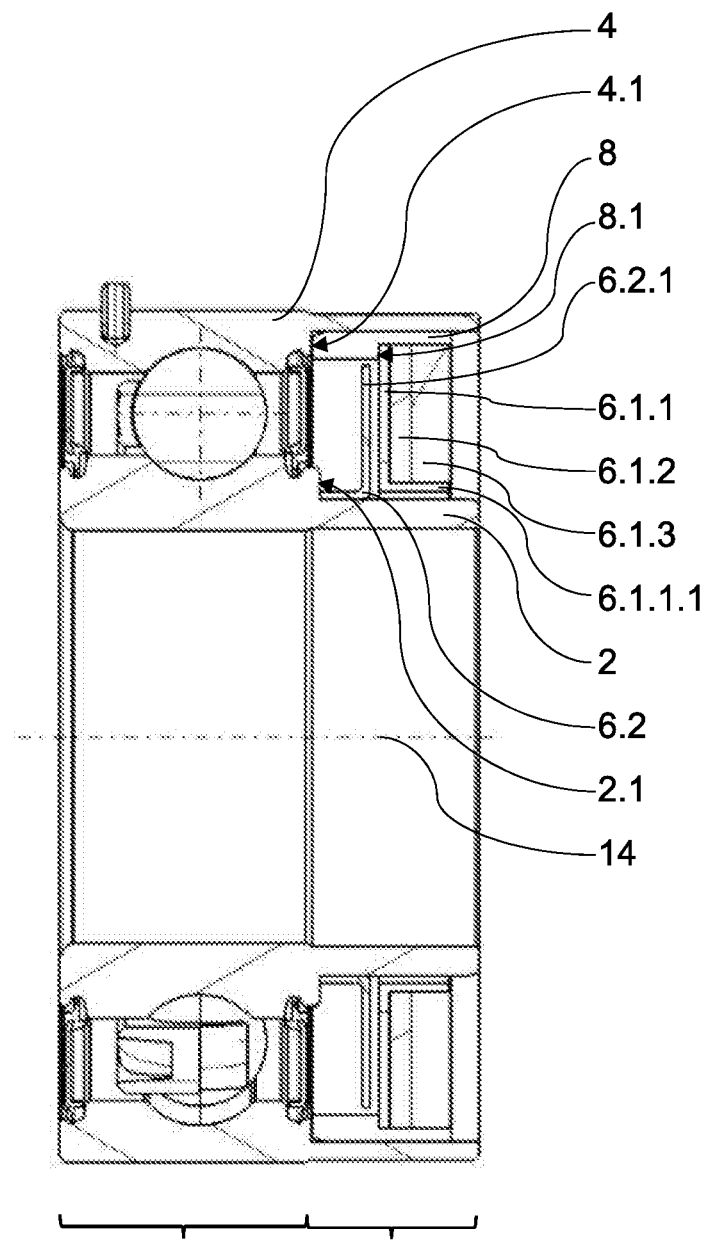
FIG. 4 the second embodiment of a bearing and a system in a sectional view.

FIGS. 3 and 4 display a second embodiment of a bearing and a system. In the following, only the differences between the first embodiment according to FIGS. 1 and 2 and the second embodiment according to FIGS. 3 and 4 are discussed. Similar or equal parts are labelled with the same reference numbers in the Figures.

In comparison to the first embodiment, the second embodiment according to FIGS. 3 and 4 does have a different spacer 8. The spacer 8 according to the second embodiment is built like a sleeve for forming a defined area for the casting compound 6.1.3 of the stator 6.1 of the inductive sensor 6. Thus, the casting compound 6.1.3 at least partly covering the electronics 6.1.2 of the stator 6.1 is being put into an area defined by the support 6.1.1 with the collar 6.1.1.1 and the sleeve 8. This can be seen best in FIG. 4. The sleeve 8 comprises a shoulder 8.1 in order to create a defined distance between the stator 6.1 and the rotor 6.2 of the bearing according to the second embodiment. The support 6.1.1 of the stator 6.1 is in contact to the shoulder 8.1 of the sleeve 8, thus providing a defined distance between the stator 6.1, comprising the support 6.1.1, the electronics 6.1.2 and the casting compound 6.1.3, and the shoulder 4.1 of the outer ring 4 and therefore providing a defined distance between the stator 6.1 and the rotor 6.2 of the inductive sensor 6.

The invention is not limited to the exemplary embodiments discussed above.

The bearing can be of any useful and applicable type, material, dimension and arrangement to a torque-proof part and a rotating part rotatable relative to the torque-proof part. The same is true for the spacer, which could be built like a radial shaft sealing ring or something similar. The inductive sensor does not have to be an absolute inductive sensor, but can be an incremental inductive sensor, too.

For example, the bearing can be built as a wheel bearing for detecting an angular position of the wheels of a car or something similar, the wheel bearing is incorporated in.

Furthermore, the measured variable is not limited to a rotational position of the inner ring relative to the outer ring of the bearing. Any useful and applicable measured variable corresponding to a rotation of the outer ring relative to the inner ring of the bearing is possible.

For instance, the aforementioned wheel bearing can be used in order to determine a wheel speed or even a more indirect measured variable corresponding to a rotation of the wheel like a position of a car or something similar. The detected position of the car by detecting the position of the wheels could be used for applications in the field of autonomous driving. Because of the fact, that the inductive sensor of the inventive bearing and the inventive system is far more precise than other sensors normally used as wheel sensors, the inventive system and the inventive bearing are satisfying the needs of the autonomous driving because of that high-resolution detection.

The stator and the rotor of the inductive sensor does not have to be arranged completely inside a sensor area, which spatial dimension is defined by the inner ring and the outer ring of the bearing. Moreover, the stator could be torque-proof connected to the inner ring and the rotor could be torque-proof connected to the outer ring, too. Connecting the stator of the inductive sensor to the torque-proof outer ring, thus to the torque-proof part, namely the housing, has advantages compared to connecting the stator of the inductive sensor to the rotatable inner ring, thus to the rotating part, namely the shaft, because of an easy design of an electronic connection of the electronics of the stator via wire. Of course, other arrangements of the stator and the rotor of the inductive sensor and other technics of an electronic connection between the electronics of the stator and an environment of the inventive bearing and the inventive system are possible, too.

In contrast to the two embodiments explained in detail, it is possible, that the electromagnetic coupling elements of the stator and the rotor of the inductive sensor are arranged substantially in parallel to a center axis of the bearing, while the inner ring and the outer ring are radially arranged to the center axis of the bearing. For example, the electromagnetic coupling element of the stator could be arranged on a surface of a flexible printed circuit board, which is connected to a surface of the inner ring or the outer ring of the bearing circumferentially arranged to the center axis of the bearing and the electromagnetic coupling element of the rotor could be arranged to the outer ring or to the inner ring of the bearing, corresponding to the inner ring or to the outer ring the stator is connected to, and circumferentially arranged to the center axis of the bearing.

The torque-proof connection of the stator and the rotor to the corresponding inner ring and outer ring can be of any useful and applicable type known to the person skilled in the art. The same is true for the casting compound and the casting of the casting compound.

Unlike the two embodiments discussed above, it is possible, that the bearing comprises a seal, which is built and arranged in such a manner, that the inductive sensor is sealed relative to an environment of the bearing. Similar is true for a system, wherein the system comprises a seal, which is built and arranged in such a manner, that the inductive sensor is sealed relative to an environment of the bearing. Therefore, not only the inductive sensor is sealed relative to an environment of the bearing, but also the interior of the bearing comprising the inductive sensor.

Furthermore, it is possible, that the bearing comprises an electromagnetic element, which is built and arranged in such a manner, that a defined electromagnetic environment is formed for the inductive sensor and/or that the system comprises an electromagnetic element, which is built and arranged in such a manner, that a defined electromagnetic environment is formed for the inductive sensor. That way, the quite undefined electromagnetic environment of the bearing without employing such an electromagnetic element is replaced by a quite defined electromagnetic environment established by using an electromagnetic element, which electromagnetic parameters are known to the designer of the bearing or the system, which comprises the bearing.

For example, the electromagnetic element could be built like a ring-shaped metal plate which substantially covers an interior of the bearing and therefore the inductive sensor relative to the environment with unknown electromagnetic conditions.

Furthermore, the electromagnetic element and the seal could be built like a combined element, thus merging both functions into one single part.

By employing the bearing or the system with the disclosed bearing, a more compact design of a bearing and a system with a sensor for detecting a measured variable corresponding to a rotation of the outer ring relative to the inner ring of the bearing is possible. Furthermore, the handling and the manufacture of the inventive bearing and the inventive system are improved.

What is claimed is:

1. A bearing, comprising:
an inner ring;
an outer ring rotatable relative to the inner ring; and
an inductive sensor for detecting a measured variable corresponding to a rotation of the outer ring relative to the inner ring, the sensor comprising:
 a stator connected to one of the inner ring and the outer ring;
 a rotor connected to the other of the inner ring and the outer ring;
 wherein a spacer is arranged between the stator and the inner ring or the outer ring to which the stator is connected, and wherein the spacer comprises a shoulder that creates a defined distance between the stator and the rotor of the inductive sensor.

2. The bearing of claim 1,
wherein the inner ring and outer ring form a bearing area for bearing the inner ring relative to the outer ring and a sensor area for supporting the inductive sensor,
wherein a spatial dimension of the sensor area is defined by the inner and outer rings,
wherein the inner ring and the outer ring each include a shoulder, and
wherein the bearing area and the sensor area of the bearing are divided by each shoulder of the inner ring and the outer ring.

3. The bearing of claim 2, wherein the sensor area and the inductive sensor are arranged such that the stator and the rotor of the inductive sensor are completely received in the sensor area.

4. The bearing of claim 1, wherein the inductive sensor comprises an absolute inductive sensor.

5. The bearing of claim 1, wherein the inner ring and the outer ring are radially arranged to a center axis of the bearing and electromagnetic coupling elements of the stator and the rotor of the inductive sensor corresponding to each other are arranged substantially perpendicular to the center axis of the bearing.

6. The bearing of claim 1, wherein the spacer comprises a ring.

7. The bearing of claim 1, wherein:
the stator comprises a support, electronics, and a casting compound;
the electronics are supported by the support and are at least partly covered by the casting compound; and
the spacer comprises a sleeve defining an area for the casting compound.

8. The bearing of claim 1, wherein:
the stator comprises a support, electronics, and a casting compound;
the electronics are supported by the support and are at least partly covered by the casting compound; and
the support comprises a collar defining an area for the casting compound.

9. The bearing of claim 1, further comprising:
a seal arranged to seal the inductive sensor relative to an environment of the bearing.

10. A system, comprising:
a housing part;
a rotating part rotatable relative to the housing part; and
the bearing according to claim 1, wherein the outer ring is connected to the housing part and the inner ring is connected to the rotating part, or wherein the outer ring is connected to the rotating part and the inner ring is connected to the housing part.

11. The system of claim 10, further comprising:
a seal arranged to seal the inductive sensor relative to an environment of the bearing.

12. The bearing of claim 1, wherein the spacer is positioned next to the shoulder of the outer ring of the bearing in order to maintain a defined distance between the shoulder and the stator.

13. The bearing of claim 12, wherein the rotor is arranged with respect to the inner ring of the bearing next to the shoulder of the inner ring.

* * * * *